(12) United States Patent
Ouyang et al.

(10) Patent No.: US 12,629,650 B2
(45) Date of Patent: May 19, 2026

(54) PARALLEL MULTI-STEP BIO-REACTION SYSTEM AND METHOD

(71) Applicant: EGI Tech (Qing Dao) Co., Limited, Shandong (CN)

(72) Inventors: Yiwen Ouyang, San Jose, CA (US); Sz-Chin Lin, San Jose, CA (US); Cheng Zhong, Menlo Park, CA (US)

(73) Assignee: EGI Tech (Qing Dao) Co., Limited, Shandong (CN)

( * ) Notice: Subject to any disclaimer, the term of this patent is extended or adjusted under 35 U.S.C. 154(b) by 481 days.

(21) Appl. No.: 18/279,657

(22) PCT Filed: Mar. 22, 2022

(86) PCT No.: PCT/CN2022/082136
§ 371 (c)(1),
(2) Date: Aug. 31, 2023

(87) PCT Pub. No.: WO2022/199557
PCT Pub. Date: Sep. 29, 2022

(65) Prior Publication Data
US 2024/0139701 A1 May 2, 2024

Related U.S. Application Data

(60) Provisional application No. 63/164,803, filed on Mar. 23, 2021.

(51) Int. Cl.
B01J 19/00 (2006.01)

(52) U.S. Cl.
CPC .. B01J 19/0046 (2013.01); B01J 2219/00326 (2013.01); B01J 2219/00351 (2013.01);
(Continued)

(58) Field of Classification Search
CPC .......... B01J 19/0046; B01J 2219/00326; B01J 2219/00351; B01J 2219/00495;
(Continued)

(56) References Cited

U.S. PATENT DOCUMENTS 6,264,891 B1 7/2001 Heyneker et al.
10,287,542 B2 * 5/2019 Park ....................... C12M 29/04
(Continued)

FOREIGN PATENT DOCUMENTS

CN          110964628 A          4/2020
CN          110964793 A          4/2020
(Continued)

OTHER PUBLICATIONS

International Application No. PCT/CN2022/082136, International Preliminary Report on Patentability mailed on Oct. 5, 2023, 6 pages.
(Continued)

*Primary Examiner* — Liban M Hassan
(74) *Attorney, Agent, or Firm* — Kilpatrick Townsend & Stockton LLP

(57) ABSTRACT

A parallel multi-step bio-reaction system(10) comprising: (a) a substrate arrangement(12) comprising a plurality of bio-reaction substrate holders(18) configured to hold a plurality of bio-reaction substrates(20); (b) a well arrangement (14) comprising a plurality of fluidic wells(22), the fluidic wells(22) corresponding to a plurality of steps of a multi-step bio-reaction; (c) an actuator(16) configured to: (i) move either the substrate arrangement(12) or the well arrangement (14) relative to the other of the substrate arrangement(12) or the well arrangement(14) to change the alignment of the bio-reaction substrates(20) as a group relative to the fluidic wells(22) as a group; and (ii) bring the bio-reaction substrates(20) into and out of contact with fluids in the fluidic wells(22).

31 Claims, 16 Drawing Sheets

(52) U.S. Cl.
CPC ................. *B01J 2219/00495* (2013.01); *B01J 2219/00585* (2013.01); *B01J 2219/0059* (2013.01); *B01J 2219/00689* (2013.01); *B01J 2219/00698* (2013.01); *B01J 2219/00702* (2013.01)

(58) Field of Classification Search
CPC ...... B01J 2219/00585; B01J 2219/0059; B01J 2219/00689; B01J 2219/00698; B01J 2219/00702
See application file for complete search history.

(56) References Cited

U.S. PATENT DOCUMENTS

| | | | |
|---|---|---|---|
| 2020/0096450 A1 | 3/2020 | Zhong et al. |
| 2021/0055283 A1 | 2/2021 | Collins |

FOREIGN PATENT DOCUMENTS

| | | | |
|---|---|---|---|
| WO | 2012126478 A1 | 9/2012 |
| WO | 2021031109 A1 | 2/2021 |

OTHER PUBLICATIONS

International Application No. PCT/CN2022/082136, International Search Report and Written Opinion mailed on Jun. 21, 2022, 10 pages.

* cited by examiner

52

16

PARALLEL MULTI-STEP BIO-REACTION SYSTEM AND METHOD

RELATED APPLICATIONS

This application is a national phase application of PCT Application No. PCT/CN2022/082136, filed Mar. 22, 2022, which claims priority to U.S. provisional application No. 63/164,803, filed Mar. 23, 2021, the entire contents of both of which are incorporated herein by this reference for all purposes.

RELATED FIELDS

Systems and methods for multi-step bio-reactions including, without limitation, DNA sequencing, oligo synthesis, and peptide synthesis.

BACKGROUND

Bio-reactions, such as DNA sequencing, oligo synthesis, and peptide synthesis often require multiple steps, several reagents, and application of those reagents at different temperatures for different amounts of time. In many biological screening and clinical assays, high sample throughput is a desirable feature which can provide benefits such as (1) capability of providing large data in a short turnaround time; (2) capability of parallel running of different testing conditions to avoid batch to batch variations; (3) lower variable cost or capital cost per sample; and (4) less frequent human intervention.

Conventional methods to increase sample throughput is usually achieved in two ways. One is by directly increasing the number of actuation modules (e.g., a multi-pipetting module) so that sequential reagent delivery to multiple bioreactors can be done simultaneously. The other way is through a serial workflow performed in a linear queue fashion.

We describe here improved parallel multi-step bio-reaction systems and methods.

SUMMARY

We describe in this patent several examples of parallel multi-step bio-reaction systems and methods.

In one example, a parallel multi-step bio-reaction system includes: (a) a substrate arrangement with a several bio-reaction substrate holders configured to hold several bio-reaction substrates; (b) a well arrangement having several fluidic wells that correspond to steps of a multi-step bio-reaction; and (c) an actuator that is configured to: (i) move either the substrate arrangement or the well arrangement relative to the other of the substrate arrangement or the well arrangement to change the alignment of the bio-reaction substrates as a group relative to the fluidic wells as a group; and (ii) bring the bio-reaction substrates into and out of contact with fluids in the fluidic wells.

The system may be configured to move either the substrate arrangement or the well arrangement in a fashion that incrementally shifts the positions of the bio-reaction substrates relative to the fluidic wells equally.

The actuator may be configured to rotate the well arrangement relative to the substrate arrangement to change alignment of the bio-reaction substrates as a group relative to the fluidic wells as a group.

The actuator may be configured to translate the well arrangement relative to the substrate arrangement to bring the bio-reaction substrates into and out of contact with fluids in the fluidic wells.

The actuator may be configured to vertically translate the well arrangement relative to the substrate arrangement to dip the bio-reaction substrates into the fluids in the fluidic wells.

The actuator may include a rotational actuator component configured to rotate the well arrangement relative to the substrate arrangement and a linear actuator component configured to translate the well arrangement relative to the substrate arrangement.

The well arrangement may be a well plate.

The well plate may be a well carousel.

The well plate may include several heaters and temperature sensors.

The well plate may include several sections, each section including at least two of the fluidic wells, each section including at least one of the heaters and at least one of the temperature sensors.

At least some of the sections may each include at least one reactive reagent fluidic well and at least one buffer fluid reagent well.

In another example, a parallel multi-step bio-reaction system includes: (a) a substrate arrangement having several bio-reaction substrate holders configured to hold several bio-reaction substrates; (b) a well arrangement including several fluidic wells corresponding to steps of a multi-step bio-reaction; (c) an actuator configured to: (i) move either the substrate arrangement or the well arrangement relative to the other of the substrate arrangement or the well arrangement to change the alignment of the bio-reaction substrates as a group relative to the fluidic wells as a group; and (ii) bring the bio-reaction substrates into and out of contact with fluids in the fluidic wells; and (d) a fluidic replacement sub-system configured to replace fluids in the fluidic wells.

The fluidic replacement sub-system may include at least one fluidic outlet and at least one fluidic inlet.

The system may include a second actuator configured to move the fluidic outlet and the fluidic inlet between a first position and a second position.

In the first position, the at least one fluidic outlet may be positioned to dispense a fresh fluid into a first fluidic well located at the fluidic replacement sub-system and the at least out fluidic inlet may be positioned to withdraw a spent fluid from the first fluidic well located at the fluidic replacement sub-system.

In the first position, the at least one fluidic outlet may be positioned above a fluid fill level of the first fluidic well.

In the first position, the at least one fluidic inlet may be positioned proximate a bottom of the first fluidic well.

In the second position, the at least one fluidic inlet may be withdrawn relative to the fluidic wells.

In some instances, the fluidic replacement sub-system may include at least a first fluidic outlet, a first fluidic inlet, a second fluidic outlet, and a second fluidic inlet; the first fluidic outlet being a first reagent fluid outlet; the second fluidic outlet being a second reagent fluid outlet; and the first reagent fluid being a different type of reagent from the second reagent fluid.

In the first position: the first fluidic outlet may be positioned to dispense a fresh first reagent fluid into a first fluidic well located at the fluidic replacement sub-system; the first fluidic inlet may be positioned to withdraw spent first reagent fluid from the first fluidic well; the second fluidic outlet may be positioned to dispense a fresh second reagent fluid into a second fluidic well located at the fluidic replacement sub-system; the second fluidic inlet may be positioned to withdraw spent second reagent fluid from the second fluidic well.

The system may also include an environmental enclosure enclosing the substrate arrangement, the well arrangement, the fluidic outlet, and the fluidic inlet.

The system may be configured to fill the environmental enclosure with a gas.

The system may include an oxygen detector configured to detect oxygen in the environmental enclosure.

The system may include a humidification sub-system configured to monitor and humidify the environmental enclosure.

The environmental enclosure may be optically opaque or not optically opaque.

The bio-reaction substrates may each include at least one surface defining several analyte binding sites.

The analyte binding sites may be an array of discrete functionalized sites configured to bind discrete analyte units.

The bio-reaction substrates may each include a detector configured to detect bio-reaction events at the analyte binding sites.

The detector may be a photodiode array.

The system may also include at least one readout sub-system, the system configured to wirelessly transmit data collected by the detector to the readout sub-system, or configured to transmit data collected by the detector to the readout sub-system over a physical data connection.

In another example, a method of performing a multi-step bio-reaction includes: (a) positioning several bio-reaction substrates in a multi-step bio-reaction system, the plurality of bio-reaction substrates being in a bio-reaction substrate arrangement, the multi-step bio-reaction system including several fluidic wells in a well arrangement; (b) positioning the bio-reaction substrate arrangement in a first alignment relative to the well arrangement; (c) while the bio-reaction substrate arrangement is in the first alignment relative to the well arrangement, exposing the bio-reaction substrates to fluid reagents in the fluidic wells; (d) removing the plurality of bio-reaction substrates from the plurality of fluid reagents; (e) moving either the substrate arrangement or the well arrangement relative to the other of the substrate arrangement or the well arrangement to change the alignment of the bio-reaction substrates as a group relative to the fluidic wells as a group to a second alignment; and (f) while the bio-reaction substrate arrangement is in the second alignment relative to the well arrangement, exposing the bio-reaction substrates to the fluid reagents, at least some of the fluid reagents each corresponding to a step of the multi-step bio-reaction.

DETAILED DESCRIPTION

Figure 1:
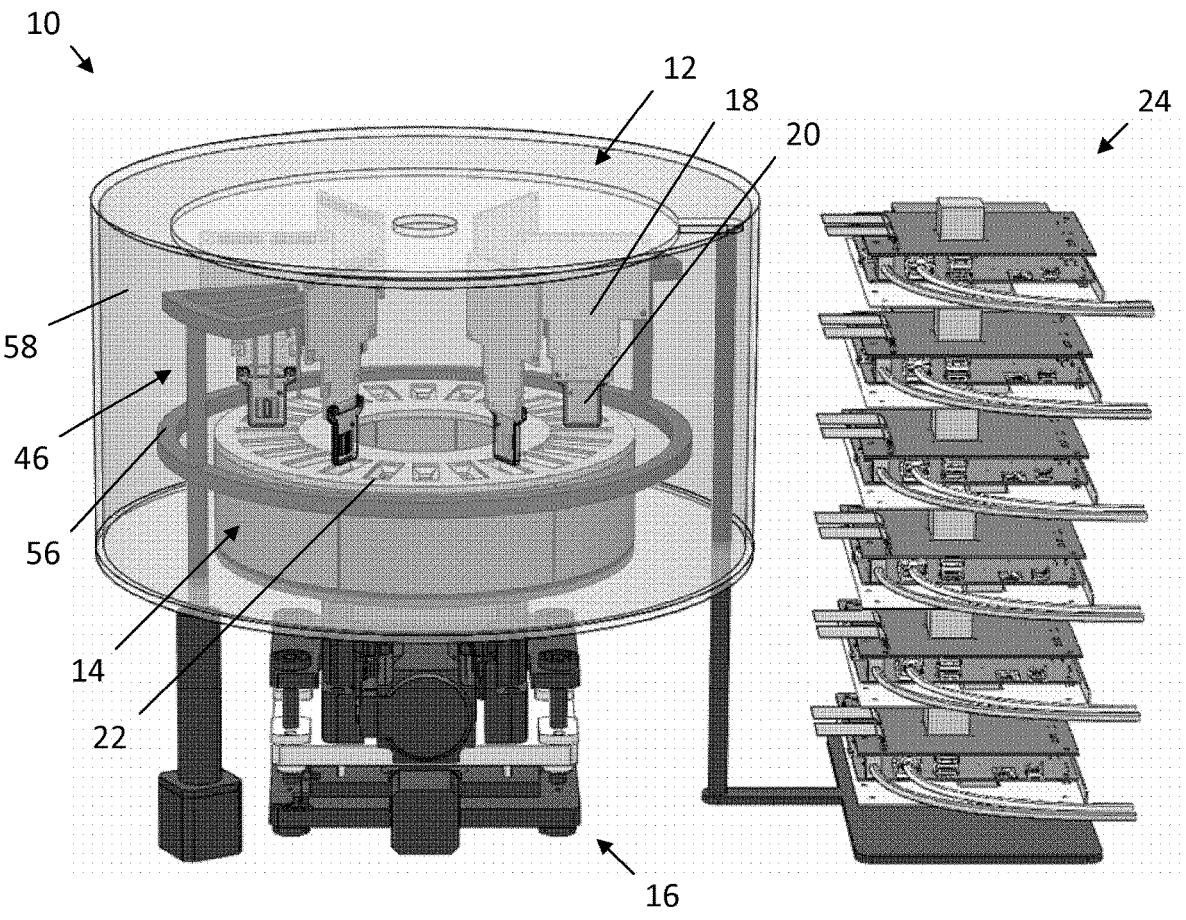
FIG. 1 shows an example of a parallel multi-step bio-reaction system.

FIG. 1 shows an example of a parallel multi-step bio-reaction system 10. The system 10 includes a substrate arrangement 12 positioned over a well arrangement 14, with the well arrangement mounted on an actuator 16. The substrate arrangement 12 includes several bio-reaction substrate holders 18, each configured to hold a bio-reaction substrate 20. The well arrangement 14 includes several fluidic wells 22, each configured to receive a fluid reagent corresponding to a step of a multi-step bio-reaction. The actuator 16 is configured to move the well arrangement 14 (in this example, by rotating the well arrangement) relative to the substrate arrangement 12, and is also configured to bring the bio-reaction substrates 20 into and out of contact with the fluids in the fluidic wells 22 (in this example, by translating the well arrangement 14 upwardly to dip the bio-reaction substrates 20 into the wells). In this manner, the system 10 is capable of cycling the bio-reaction substrates 20 through multiple steps of a bio-reaction, with the well arrangement 14 configured as a well carousel to sequentially present reagents of the multi-step bio-reaction to each of the bio-reaction substrates 20.

In the particular example shown in FIG. 1, system 10 also includes a readout sub-system 24 for receiving data collected at the bio-reaction substrates 20, although, in other implementations, system 10 may utilize bio-reaction substrates 20 that are not configured for data collection themselves and that instead use separate systems to gather data from the bio-reaction substrates 20 (e.g. a separate imaging system configured to image the bio-reaction substrates).

Bio-Reaction Substrate

Figure 2:
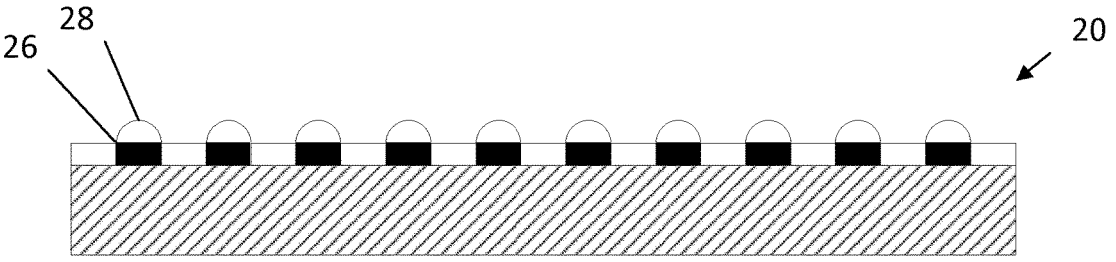
FIG. 2 shows an example of a bio-reaction substrate.

FIG. 2 shows a schematic example of a bio-reaction substrate 20. A surface of the bio-reaction substrate 20 includes an array of binding sites 26 for binding the analyte 28 on which the multi-step bio-reaction will be performed. Analyte may be nucleic acid material such as DNA or RNA to be sequenced, or other biological or non-biological/synthetic material to be analyzed or otherwise be subjected to a multi-step bio-reaction. In one specific example, analyte may be DNA nanoballs or other discrete nucleic acid samples to be sequenced or otherwise analyzed. Analyte may be arranged in a spaced array of discrete units partially or entirely across one or more surfaces of the bio-reaction substrate. Although only a few discrete analyte 28 sites are shown in FIG. 2 for illustrative purposes, it should be understood that arrays may include up to millions or billions of discrete analyte sites, spaced at pitches that may be on the order of tens or hundreds of nanometers.

The binding sites may be discrete sites arranged in arrays on one or more surfaces of the bio-reaction substrate, and may be fabricated by well-known lithography tools, such as 248-nm KrF (krypton fluoride), 193-nm ArF (argon-fluoride) lithography systems, or e-beam lithography systems. The arrays are typically separated with spaces between each other in ultra-high density, high density, medium density, or low density. At ultra-high density, separation is less than 250 nm. At high density, separation is 300 to 350 nm. At medium density, separation is 400 nm to 500 nm. At low density, separation is 500 nm or more. In some implementations using DNA nanoballs (for example, some low density DNA nanoball implementations) 2-dimensional patterning with photoresist is sufficient to sequester DNA nanoballs or other discrete nucleic acid samples. In some implementations (for example, some medium, high, or ultra-high density implementations using DNA nanoballs), to reduce risk that discrete samples will not remain in single locations, smaller samples may be required, which may require 3-dimensional patterning for more efficient capturing of fluorescence from tagged DNA nanoballs or other tagged nucleic acid samples. In such implementations, 3-dimensional patterned well nanostructures can be developed by non-binding material as a well wall and binding material for the well bottom surface for sequestering DNA nanoballs.

Figure 3:
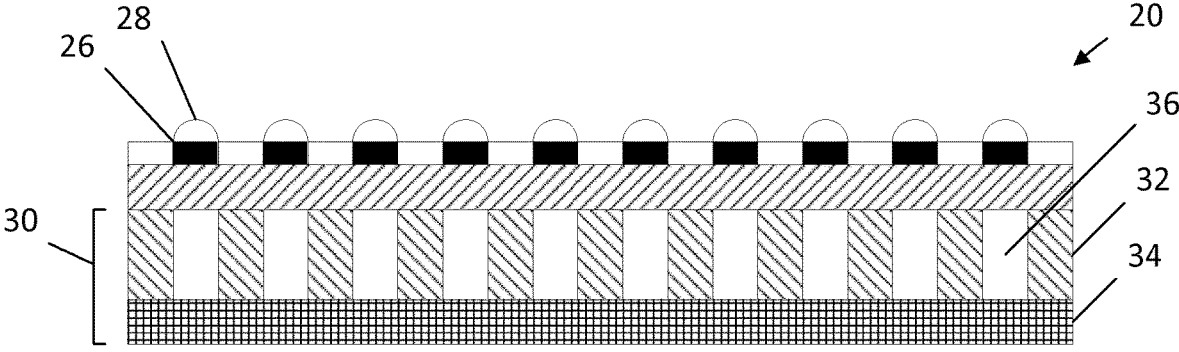
FIG. 3 shows another example of a bio-reaction substrate.

In the example shown in FIG. 2, bio-reaction substrate 20 does not include integrated imaging functionality. FIG. 3 shows an example of a bio-reaction substrate 20 that is similar to the bio-reaction substrate 20 of FIG. 2, but also includes integrated imaging functionality. The bio-reaction substrate 20 of FIG. 3 includes a detector 30, having a photo sensing layer 32 and an electronic circuit layer 34. Detector 30 may be a complementary metal-oxide-semiconductor (CMOS) image sensor. The photo sensing layer 32 includes an array of spaced apart photodiodes 36, with each photodiode positioned directly below a corresponding analyte binding site 26 and configured to detect fluorescence from the analyte 28 positioned directly above that photodiode. The detector 30 shown in FIG. 3 is just one example of one type of detector that could be integrated into the bio-reaction substrate, and other types and configurations may be included for detecting analyte fluorescence or other bio-reaction events at the analyte binding sites.

Data captured at detector 30 may be transmitted (either wirelessly or over a physical data connection) to the readout sub-system 24.

US 2020/0096450 A1, published Mar. 26, 2020 to Zhong et al., and US 2018/0155782 A1, published Jun. 7, 2018 to Zhong, describe additional examples of bio-reaction substrates with integrated imaging functionality and methods of manufacturing. These also are just examples, and system 10 may be configured for use with other types of bio-reaction substrates.

System Cycling

The system 10 of FIG. 1 is configured to cycle the bio-reaction substrates 20 through multiple steps of a bio-reaction in parallel. In the example of FIG. 1, the actuator 16 advances each bio-reaction substrate 20 from a step (or a sub-step) to the next by moving (in this example rotating) the well arrangement 14 relative to the substrate arrangement 12 to change the alignment of the bio-reaction substrates 20 as a group relative to the fluidic wells 22 as a group. In other examples, the substrate arrangement 12 is movable relative to the well arrangement 14 to change the alignment of the bio-reaction substrates 20 as a group relative to the fluidic wells 22 as a group.

Figure 4:
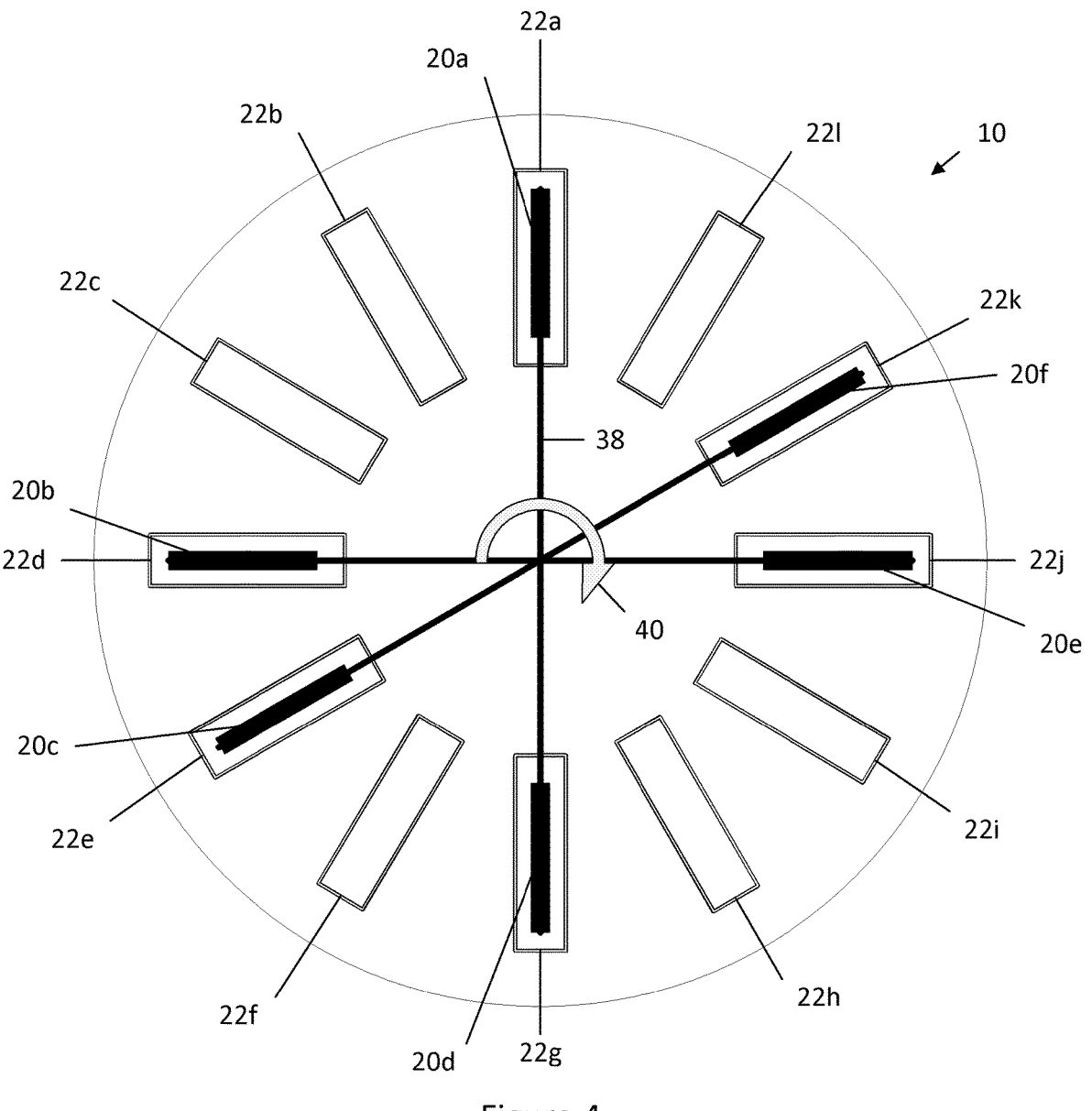
FIG. 4 shows another example of a parallel multi-step bio-reaction system, showing a substrate arrangement relative to a well arrangement from the top down.

FIG. 4 schematically shows the substrate arrangement and the well arrangement of the system 10 of FIG. 1 looking from the top down. In FIG. 4, the bio-reaction substrates 20a-f (or bio-reaction substrate holders) can be seen mounted on a static framework 38 above the movable fluidic wells 22a-l of the well arrangement. In other implementations, framework 38 is not necessary and other structure may be used for mounting bio-reaction substrates (and/or bio-reaction substrate holders) in the system. For example, in some implementations, bio-reaction substrates (and/or bio-reaction substrate holders) may be supported in slots extending through an enclosure of the system.

In the alignment shown in FIG. 4, bio-reaction substrate 20a is above fluidic well 22a, substrate 20b is above well 22d, substrate 20c is above well 22e, substrate 20d is above well 22g, substrate 20e is above well 22j, and substrate 20f is above well 22k. In this alignment, when the actuator (not shown in FIG. 4) vertically translates the well arrangement relative to the substrate arrangement, the bio-reaction substrates 20a, b, c, d, e, and f will dip into the fluidic wells 22a, d, e, g, j, and k respectively.

The well arrangement may be rotated relative to the substrate arrangement (or vice versa) to incrementally shift the positions of the bio-reaction substrates relative to the fluidic wells. For example, the fluidic wells 22a-l in FIG. 4 may be rotated in a clockwise direction 40 to move the fluidic wells 22a-l to the positions shown in FIG. 5. In the alignment shown in FIG. 5, bio-reaction substrate 20a is above fluidic well 22b, substrate 20b is above well 22e, substrate 20c is above well 22f, substrate 20d is above well 22h, substrate 20e is above well 22k, and substrate 20f is above well 22l. In this alignment, when the actuator vertically translates the well arrangement relative to the substrate arrangement, the bio-reaction substrates 20a, b, c, d, e, and f will dip into the fluidic wells 22b, e, f, h, k, and l respectively.

Figure 5:
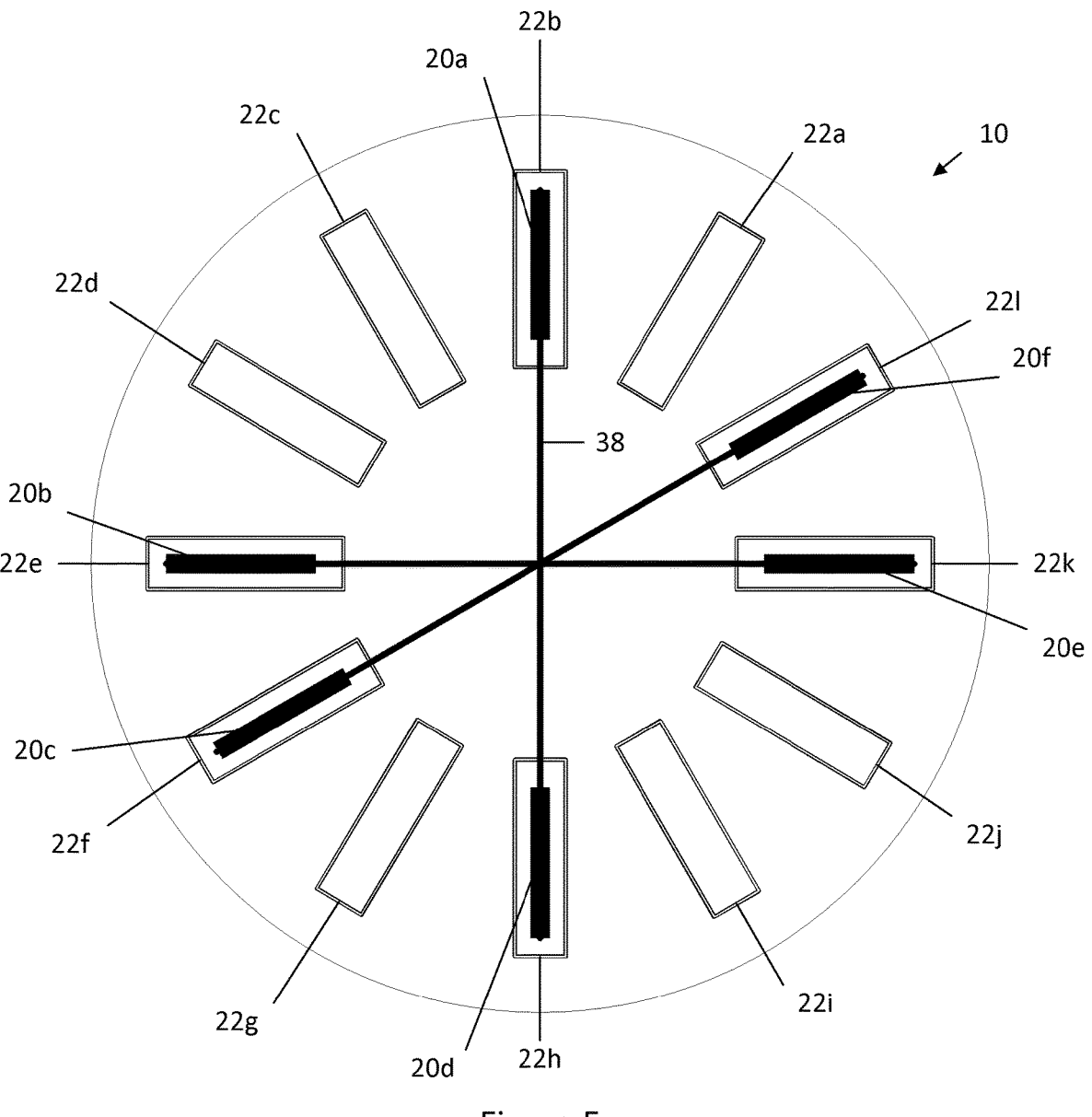
FIG. 5 shows the system of FIG. 4 after rotation of the well arrangement relative to the substrate arrangement.

In the example illustrated by FIGS. 4 and 5, the relative positions of the fluidic wells 22a-l and bio-reaction substrates 20a-f have all been equally incrementally shifted in a clockwise direction by a single position. For instance, from FIG. 4 to FIG. 5, the relative position of bio-reaction substrate 20a shifts from fluidic well 22a to fluidic well 22b. In other examples, the system may incrementally shift the fluidic wells relative to the bio-reaction substrates in greater degrees. For example, the system 10 may incrementally shift the relative positions of the fluidic wells 22a-l and bio-reaction substrates 20a-f by two positions, such that each of the bio-reaction substrates 20a-f effectively skips over a fluidic well (e.g. bio-reaction substrate 20a shifts from fluidic well 22a to fluidic well 22c without stopping over fluidic well 22b).

In some implementations, each of fluidic wells 22a-l corresponds to a different step (or sub-step) of a multi-step bio-reaction. For example, fluidic well 22a may be filled with a reagent that reacts with the analyte on a bio-reaction substrate when dipped in the fluidic well 22a, and fluidic well 22b may be filled with a buffer reagent that removes or dilutes the previous reaction reagent's effect when the bio-reaction substrate is subsequently diluted in fluidic well 22b. In other implementations, some of the fluidic wells may correspond to the same step (or sub-step) of the multi-step bio-reaction. For example, both fluidic wells 22a and 22b may be filled with the same reaction reagent and fluidic well 22c may be filled with a buffer reagent that removes or dilutes the reaction reagent of fluidic wells 22a and 22b.

Filling the fluidic wells in this manner may be done when it is desirable for the bio-reaction substrates to spend different amounts of time in different steps (or sub-steps) of the multi-step bio-reaction (e.g. if it is desirable for the bio-reaction substrate to spend twice as much time in exposure to a reaction reagent than to a buffer reagent).

Reagent Temperature Control

Figure 6:
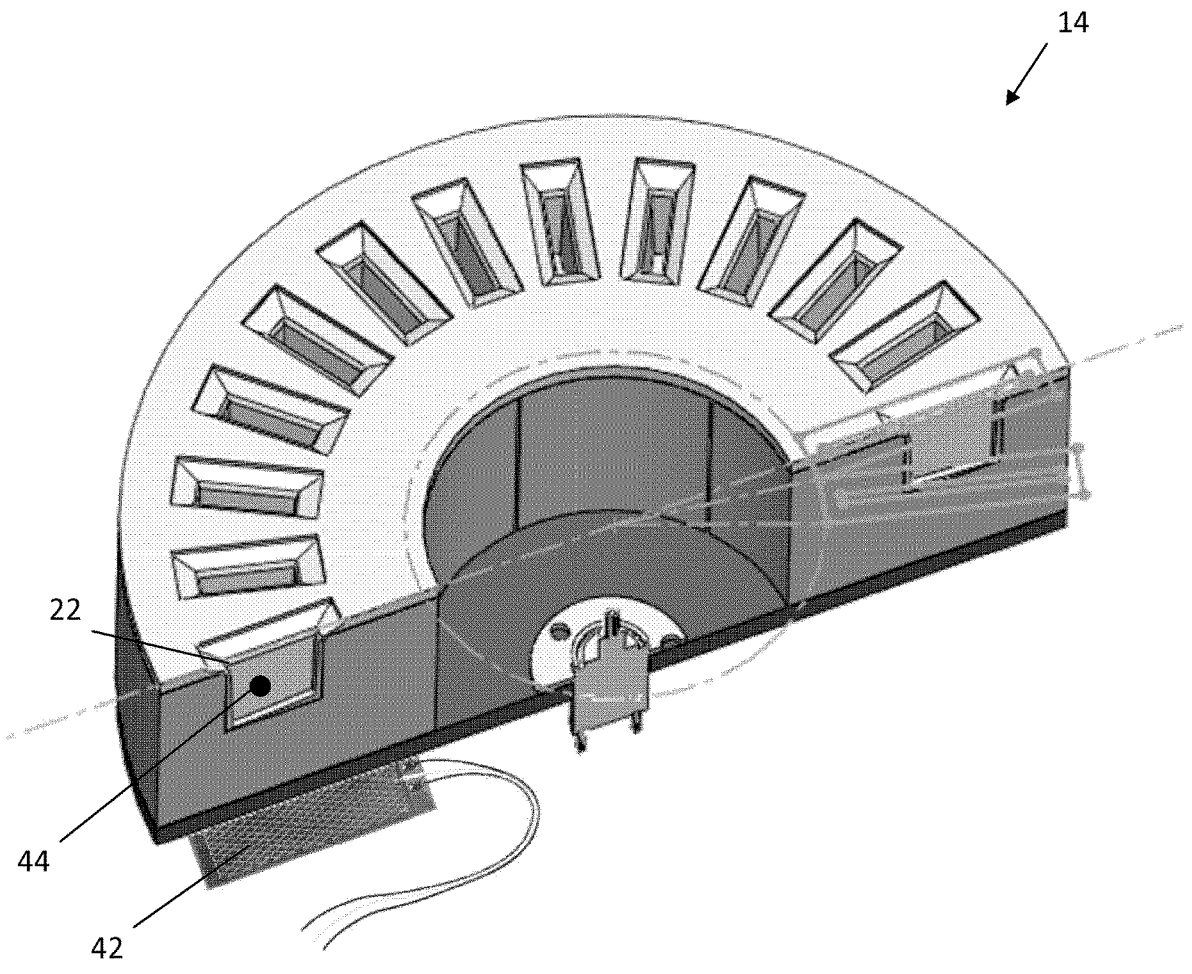
FIG. 6 shows an example of a well plate in cross-section.

FIG. 6 shows the well arrangement 14 of FIG. 1 in cross-section. In this example, well arrangement 14 is a well plate, with the fluidic wells 22 dimensioned to receive and immerse the analyte presenting portions of a bio-reaction substrate in a fluid reagent. In the example of FIG. 6, each of the fluidic wells 22 is associated with a heater 42 and temperature sensor 44 for individually regulating the temperature of the reagents in each fluidic well 22. In some implementations, the heater 42, in response to feedback from the temperature sensor 44, may be heated to a degree appropriate for the particular step or sub-step of the bio-reaction being performed in that particular fluidic well 22. In the particular example shown, temperature sensor 44 is shown positioned inside the fluidic well 22 and heater 42 may be embedded in a lower portion of the well plate; however, in other examples, other positions and arrangements of temperature sensor 44 and heater 42 are possible.

Figure 7:
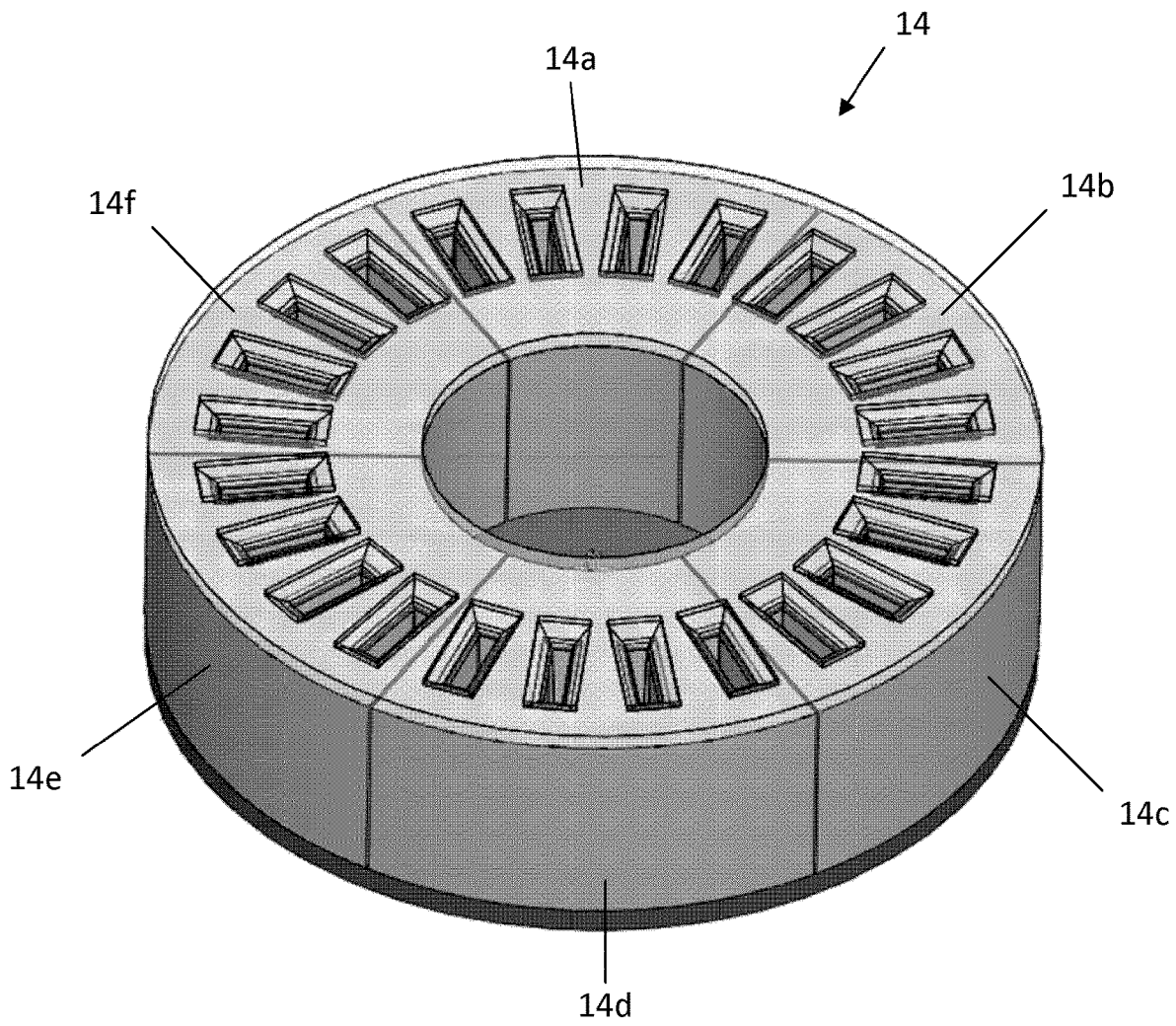
FIG. 7 shows another example of a well plate.

In the example of FIG. 6, each fluidic well 22 has an individual temperature sensor 44 and heater 42 for individually regulating the temperature of the reagent of each fluidic well 22. In other examples, each fluidic well 22 does not have its own temperature sensor and heater. For example, FIG. 7 shows a well arrangement 14 divided into six seconds 14a-f. Although not shown in FIG. 7, each section 14a-f may have its own heater and temperature sensor for regulating the temperature of the reagents in the fluidic wells of each section. In other words, the four fluidic wells in section 14a may have a single temperature sensor and heater for regulating the temperature of the fluids in those wells.

Fluidic Replacement Sub-System

Figure 8:
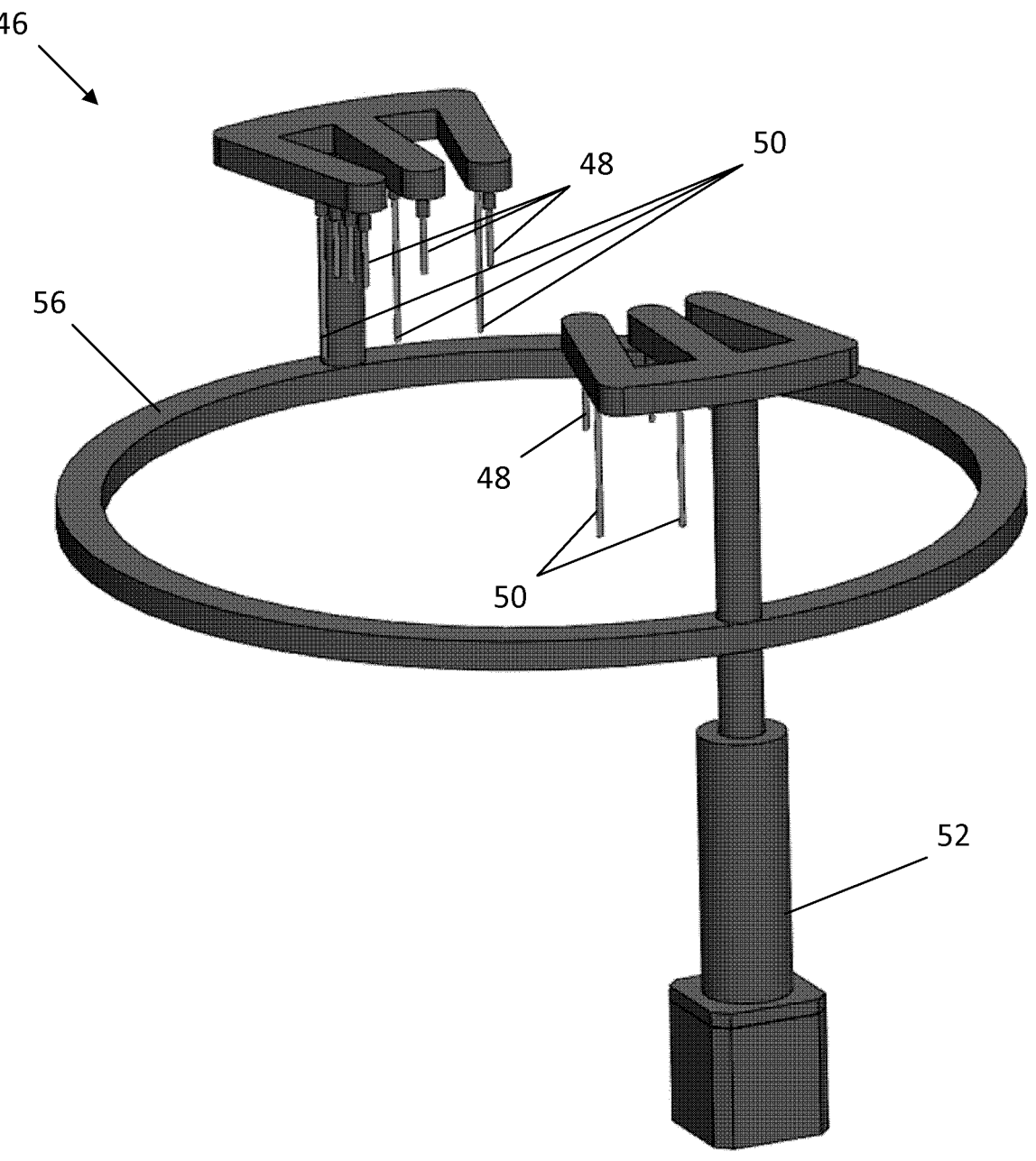
FIGS. 8 and 9 show an example of a fluidic replacement sub-system.
Figure 9:
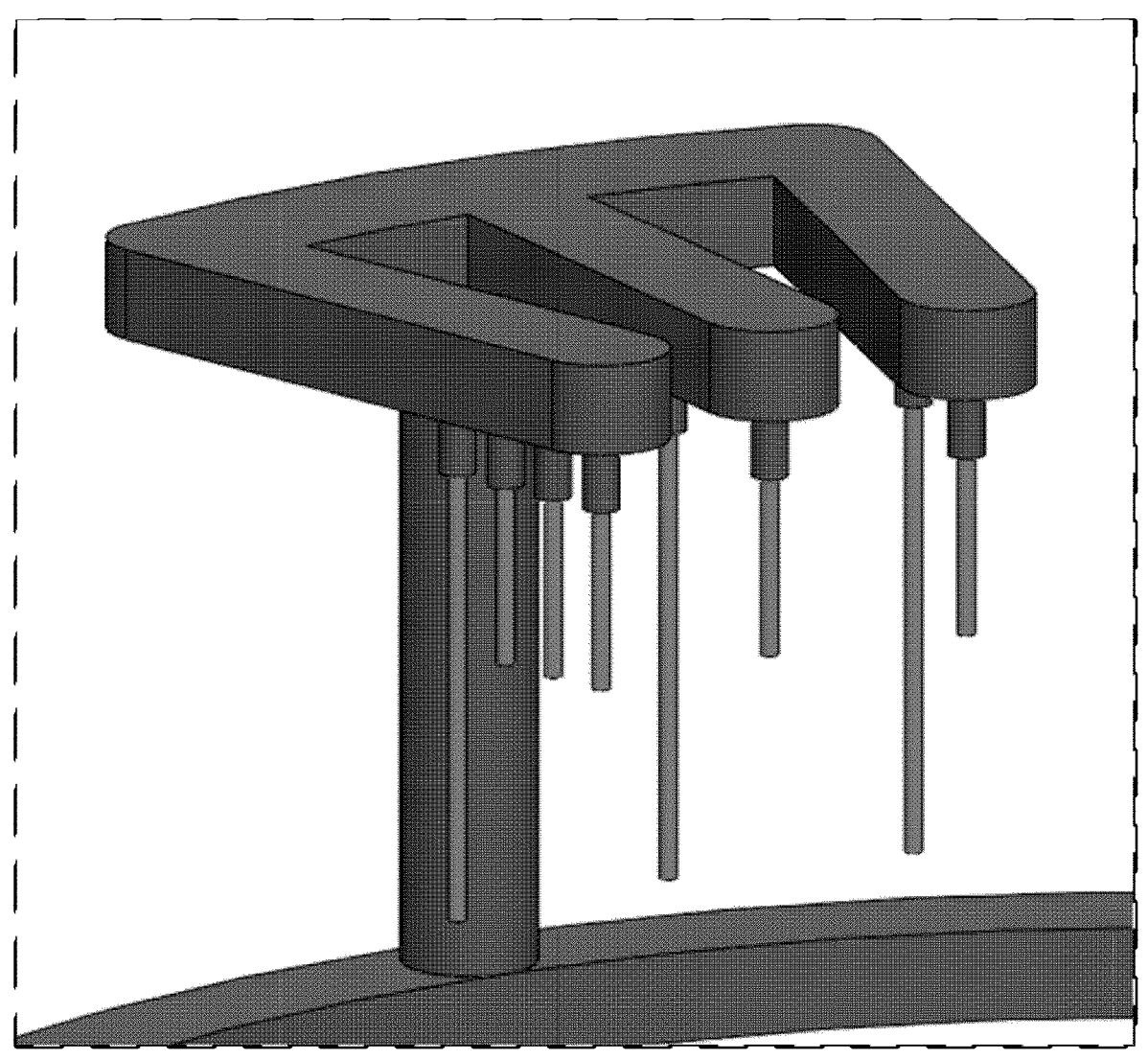

In the example shown in FIG. 1, the multi-step bio-reaction system 10 also includes a fluidic replacement sub-system 46 configured to replace fluids in the fluidic wells 22. FIGS. 8 and 9 show portions of the fluidic replacement sub-system 46 removed from other parts of system 10, with FIG. 9 being a magnified portion of FIG. 8. The fluidic replacement sub-system 46 includes several fluidic outlets 48 and several fluidic inlets 50. The fluidic replacement sub-system 46 also includes an actuator 52 configured to move (in this example, vertically translate) the outlets 48 and inlets 50 between a first position in which the outlets 48 and inlets 50 are located to replace spent reagents in the fluidic wells with fresh reagents and a second position in which the outlets 48 and inlets 50 are moved away from the fluidic wells. In the particular examples shown in FIGS. 1 and 8, multiple groupings of fluidic inlets and outlets are supported on a common framework 56, such that a single actuator 52 can translate the multiple groupings of fluidic inlets and outlets spaced about the well arrangement 14.

Figure 10:
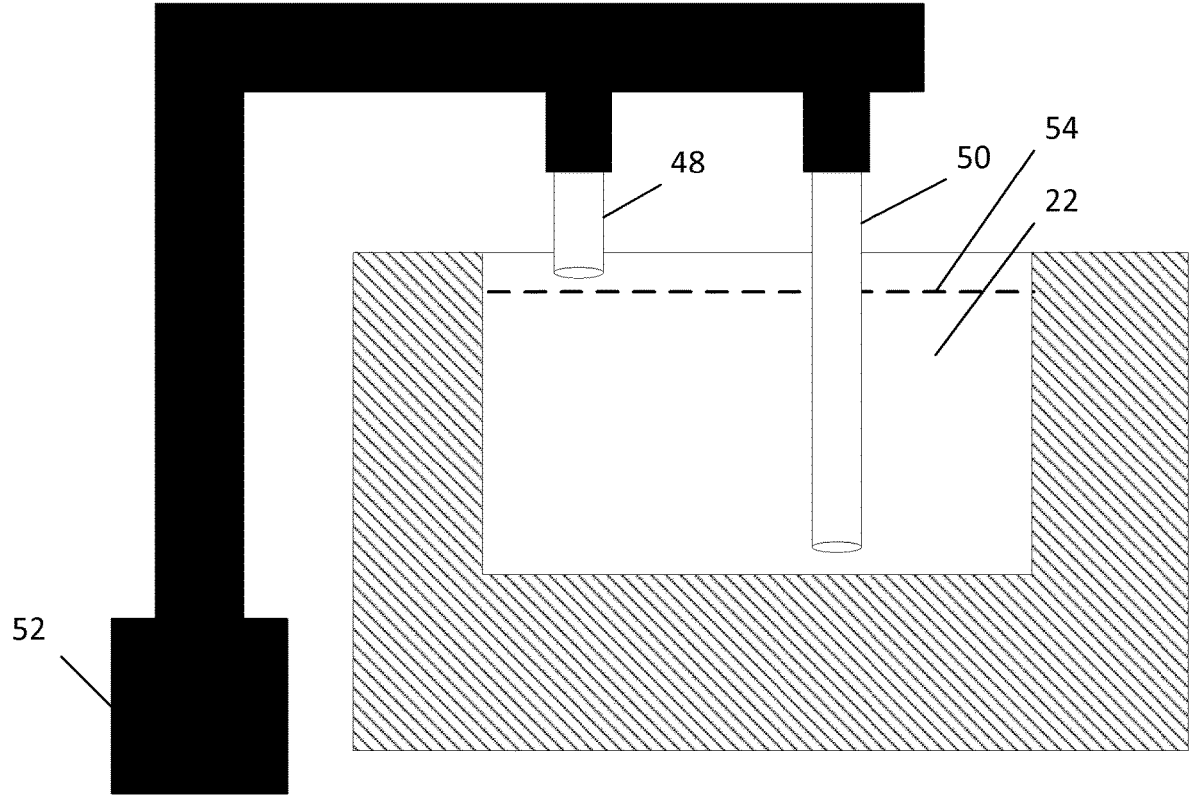
FIG. 10 schematically shows another example of fluid replacement sub-system, showing a fluidic inlet and fluidic outlet positioned to replace the fluid in a well.
Figure 11:
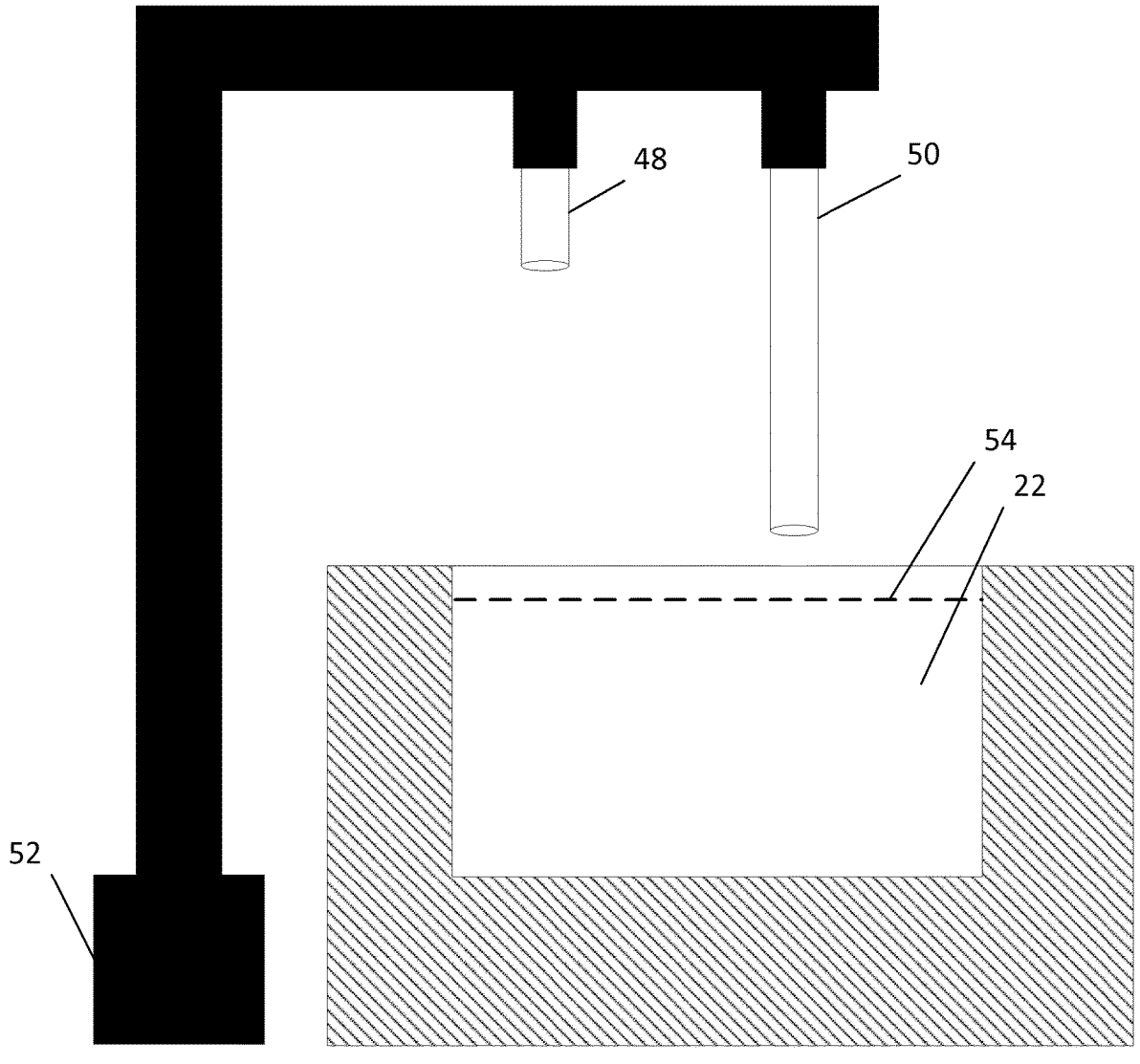
FIG. 11 shows the example from FIG. 10, with the fluidic inlet and outlet translated away from the well.

FIG. 10 schematically illustrates an example of a single fluidic outlet 48 and fluidic inlet 50 positioned to replace spent reagents in a fluidic well 22. The fluidic outlet 48 is positioned to dispense fresh reagent into the fluidic well 22 and fluidic inlet 50 is positioned to withdraw spent reagent from the fluidic well 22. In this particular example, the fluidic outlet 48 is positioned above a fluid fill level 54 of the fluidic well 22, which may reduce the risk of cross-contamination between fluidic wells. In other words, the fluidic outlet 48 is positioned and otherwise configured to dispense fresh reagent fluid into the fluidic wells while avoiding contact with spent reagent fluid in those wells. In this particular example, the fluidic inlet 50 is positioned proximate the bottom of the fluidic well 22, to allow for substantial if not entire withdrawal of spent reagent fluid. FIG. 11 shows the outlet 48 and inlet 50 of FIG. 10 moved away from the fluidic well 22 by actuator 52, with inlet 50 completely withdrawn from and clear of the fluidic well 22 so that the fluidic replacement sub-system does not interfere with the rotation of the well arrangement.

Figure 12:
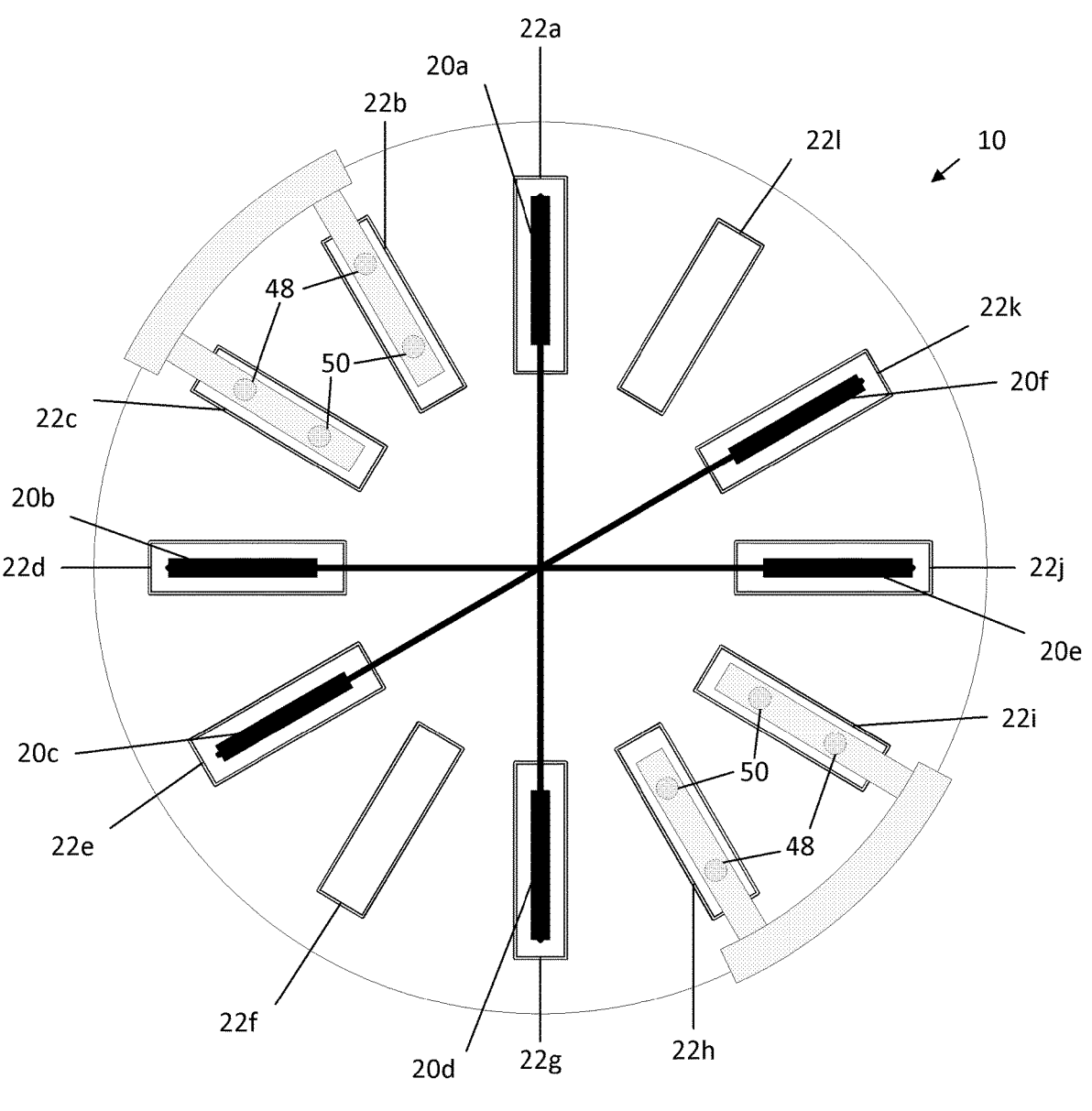
FIG. 12 shows another example of a parallel multi-step bio-reaction system, showing a substrate arrangement, a well arrangement, and a fluidic replacement sub-system from the top down.

FIG. 12 schematically illustrates an example of a parallel multi-step bio-reaction system in which the locations of the outlets 48 and inlets 50 of the fluidic replacement sub-system are interleaved with the locations of the bio-reaction substrates 20 (or bio-reaction substrate holders). FIG. 12 shows the system from the top down, and the dashed circles indicate the locations of the outlets 48 and the inlets 50 relative to the fluidic wells 22. In this example, the fluidic replacement sub-system can replace fluids in the fluidic wells positioned adjacent the fluidic outlets 48 and inlets 50 (fluidic wells 22b, c, h, and i) while the bio-reaction substrates 20a-f are positioned adjacent other fluidic wells (fluidic wells 22a, d, e, g, j, and k respectively). In some implementations, the fluidic replacement sub-system can replace fluids in the wells positioned adjacent the fluidic outlets 48 and 50 at the same time the bio-reaction substrates 20a-f are immersed in reagents in the fluidic wells 22 adjacent those substrates. In other implementations, fluidic replacement does not occur simultaneously with substrate immersion in reagent.

Figure 13:
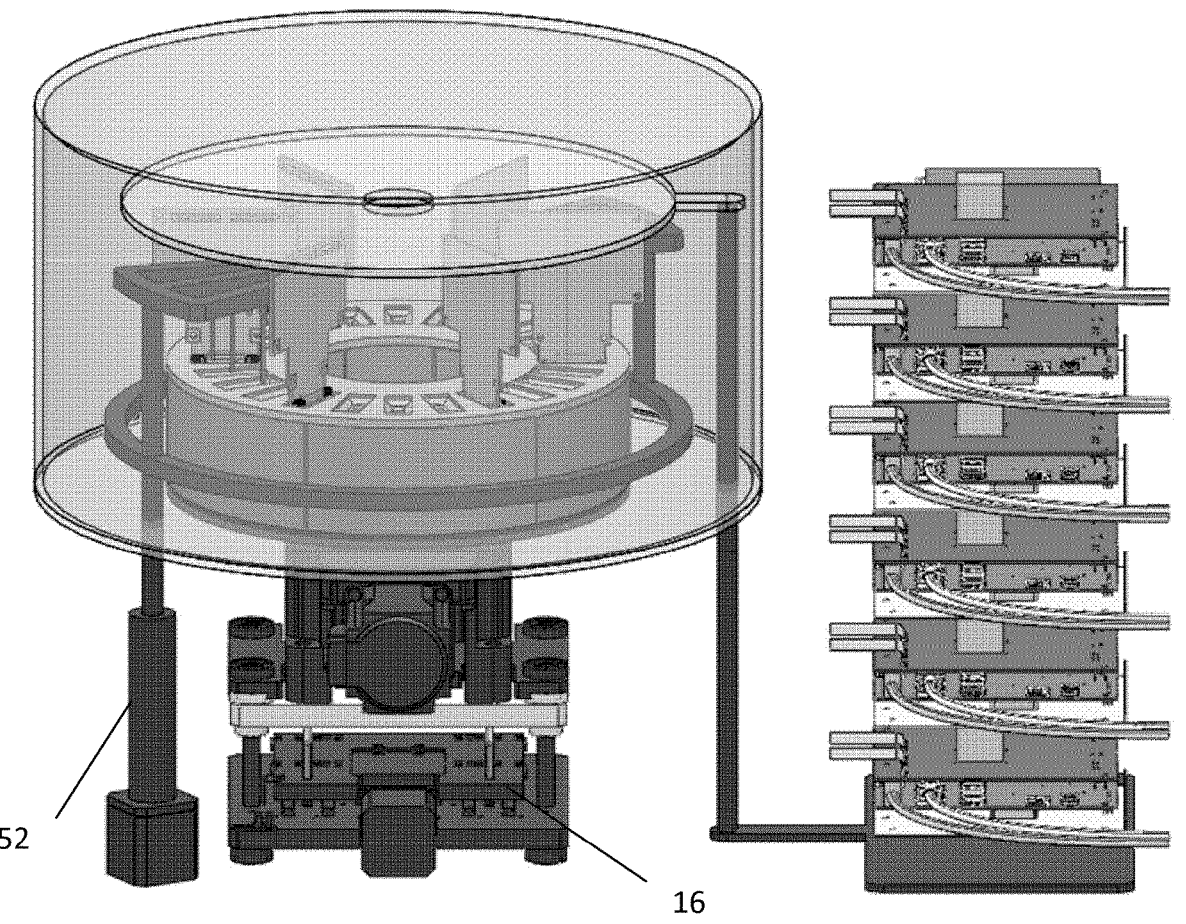
FIGS. 13*a-c* show the system of FIG. 1 in a mode with the bio-reaction substrates immersed in fluid in the fluidic wells (FIG. 13*a*), in a mode with the bio-reaction substrates removed from the fluidic wells (FIG. 13*b*), and in a mode with the fluidic replacement sub-system positioned to replace the fluids in some of the fluidic wells (FIG. 13*c*).
Figure 13:
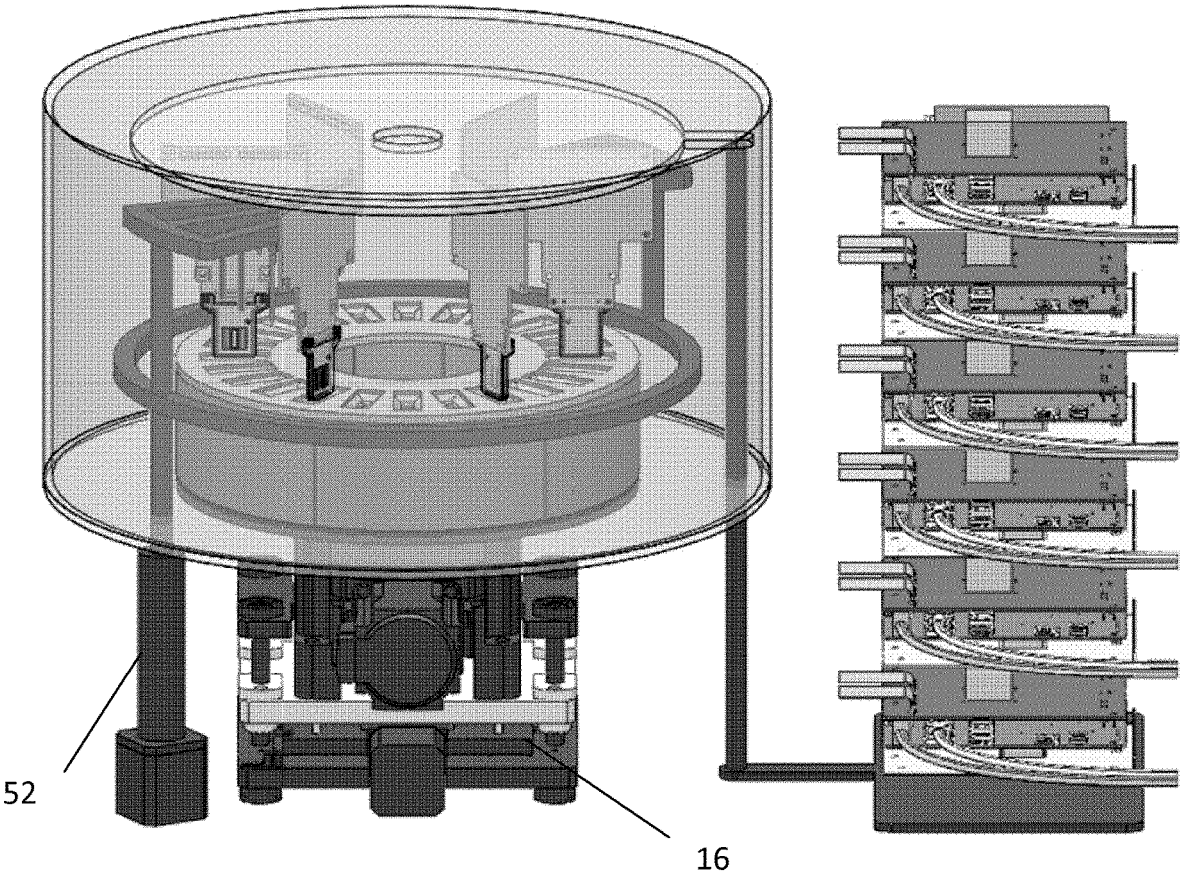
Figure 13:
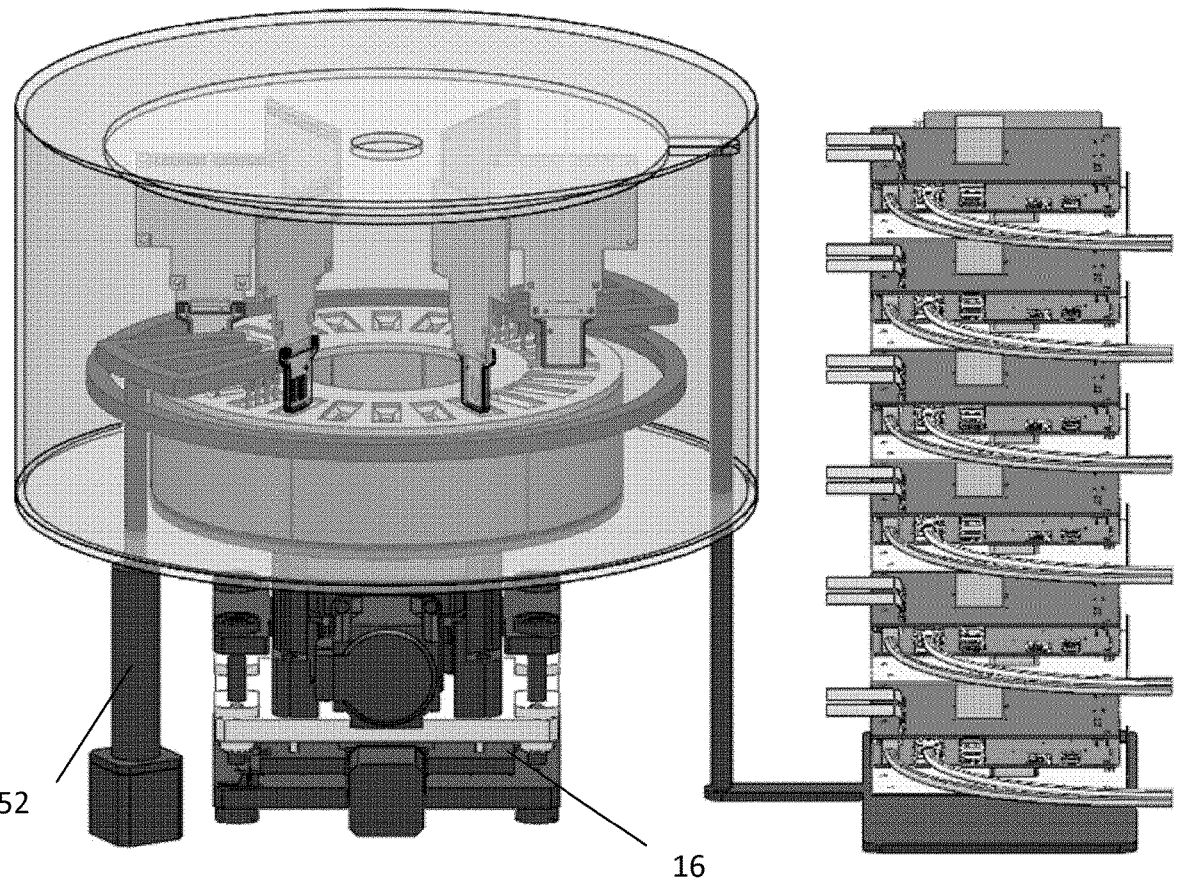

FIGS. 13a-c show one example of where dipping of bio-reaction substrates does not occur simultaneously with refilling of fluidic wells. In FIG. 13a, bio-reaction substrates (or at least portions of those substrates) are immersed in reagents in the fluidic wells where those substrates are located. In FIG. 13a, actuator 16 has translated the well arrangement to an upper position and actuator 52 has translated the fluidic outlets and inlets to an upper position as well. In FIG. 13b, the bio-reaction substrates are no longer immersed in reagents. In FIG. 13b, actuator 16 has translated the well arrangement to a lower position and actuator 52 has retained the fluidic outlets and inlets at the same upper position as in FIG. 13a. In FIG. 13c, the bio-reaction substrates remain in the same position as in FIG. 13b, and the fluidic outlets and inlets are lowered to fluid replacement positions, such as the positions shown in FIG. 10. In FIG. 13c, actuator 16 has retained the well arrangement to the same lowered position as FIG. 13b and actuator 52 has lowered the outlets and inlets to their fluid replacement positions.

The different outlets 48 of the fluidic replacement sub-system 46 may be configured to dispense different types of reagents. For instance, in FIG. 12, the outlet 48 adjacent fluidic well 22c may dispense a reaction reagent while the outlet 48 adjacent fluidic well 22b may dispense a buffer reagent. In this manner, the system 10 may simultaneously replace the fluids in different wells with different reagents.

Environmental Enclosure

Returning to the example of FIG. 1, the system 10 in this example also includes an environmental enclosure 58. In FIG. 1, the environmental enclosure encloses the substrate arrangement 12, the well arrangement 14, and the inlets and outlets of the fluidic replacement sub-system 46. The environmental enclosure 58 may translate up and down along with the well arrangement 14 (e.g. as shown in FIGS. 13a-c). In other implementations, the environmental enclosure may remain static relative to the well arrangement 14 and/or substrate arrangement 12.

Figure 14:
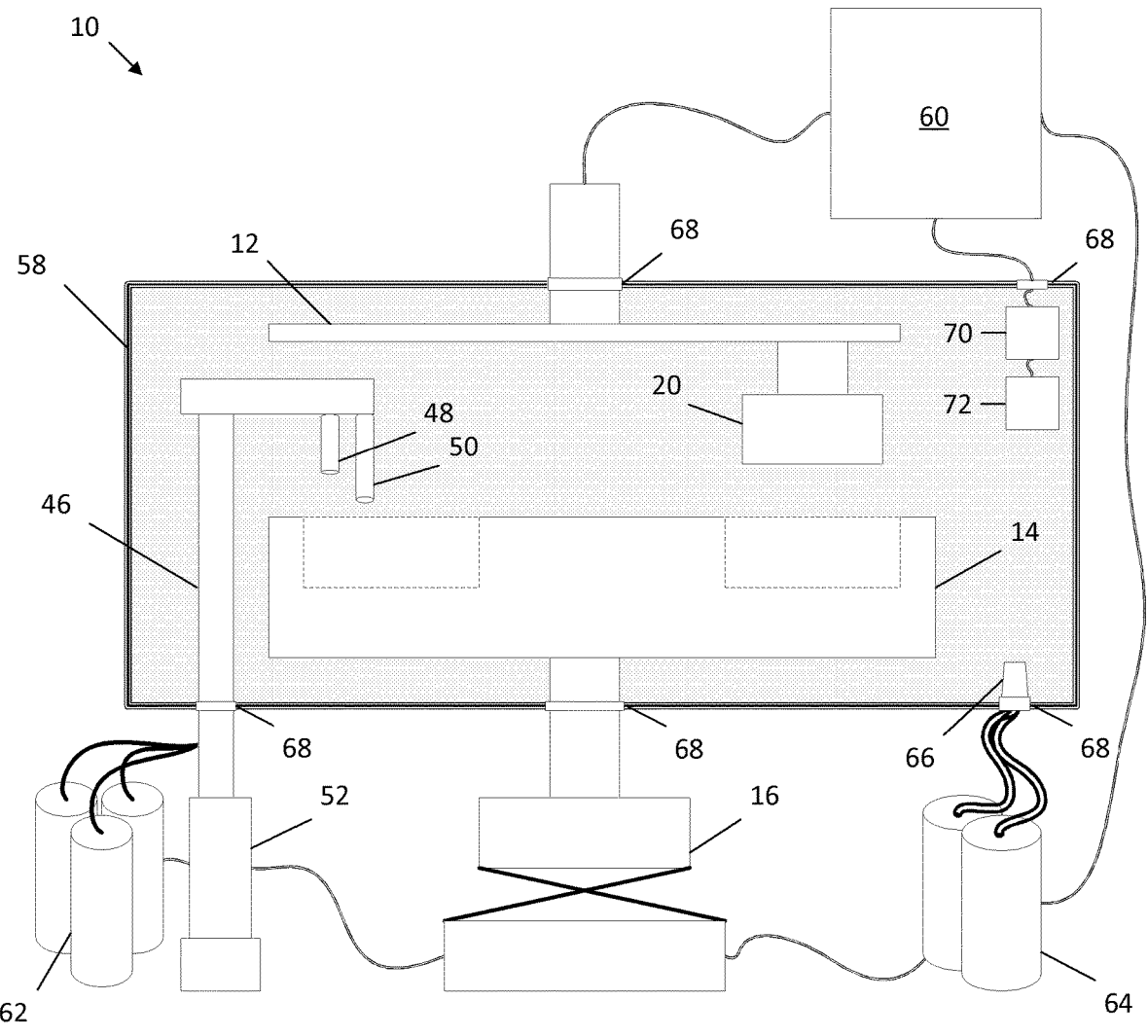
FIG. 14 schematically shows another example of a parallel multi-step bio-reaction system including an environmental enclosure.

FIG. 14 shows another example of a parallel multi-step bio-reaction system 10 including an environmental enclosure 58. As with the example of FIG. 1, the environmental enclosure 58 of the system 10 in this example encloses the substrate arrangement 12 (only one bio-reaction substrate 20 is shown in this example for simplicity), the well arrangement 14, and the outlets 48 and inlets 50 of the fluidic replacement sub-system 46 (only one pair is shown in this example for simplicity). Other components of the system 10 are located outside of the enclosure 58, including the electric drive motors for the actuators 16, 52, a digital system controller 60, containers 62 for fresh and spent reagents, and an inert gas source 64 (discussed further below). The controller 60 may also include a readout sub-system similar to the readout sub-system 24 discussed above in the example of FIG. 1, or may include a separate readout sub-system, or may not include a readout sub-system at all.

In the example of FIG. 14, the system 10 is configured to fill the environmental enclosure 58 with an inert or other low-reactivity gas or gasses. Gas source 64 supplies the gas for filling the environmental enclosure through nozzle 66. The system 10 may fill the environmental enclosure 58 with an inert or other low reactivity gas or gasses to remove oxygen from the environment inside of the enclosure 58. In some instances, the environmental enclosure 58 may be filled with an inert or other low-reactivity gas or gasses to an internal pressure that is higher than the local atmospheric pressure. In some instances, the environmental enclosure 58 may be filled with an inert or other low-reactivity gas or gasses to an internal pressure of 80 kPa-106 kPa. The environmental enclosure 58 may include seals 68 where other components of the system 10 pass through the enclosure 58. The environmental enclosure 58 may include a vent.

In some implementations, filling the environmental enclosure 58 with an inert or other low reactivity gas or gasses may prolong the life of the reagents used in the multi-step bio-reaction or may otherwise be helpful to the performance of the multi-step bio-reaction. Filling the environmental enclosure 58 with an inert or other low reactivity gas or gasses may facilitate removal of oxygen from the enclosure or otherwise limit the reagents' exposure to oxygen.

In the example of FIG. 14, the system 10 also includes an oxygen detector 70 configured to monitor the interior of the environmental enclosure 58 for oxygen. Based on feedback from the oxygen detector 70, the system 10 can regulate the supply of gas from source 64 and/or alert an operator to the presence of oxygen (or the exceeding of a maximum level of oxygen) inside the environmental enclosure 58.

Figure 15:
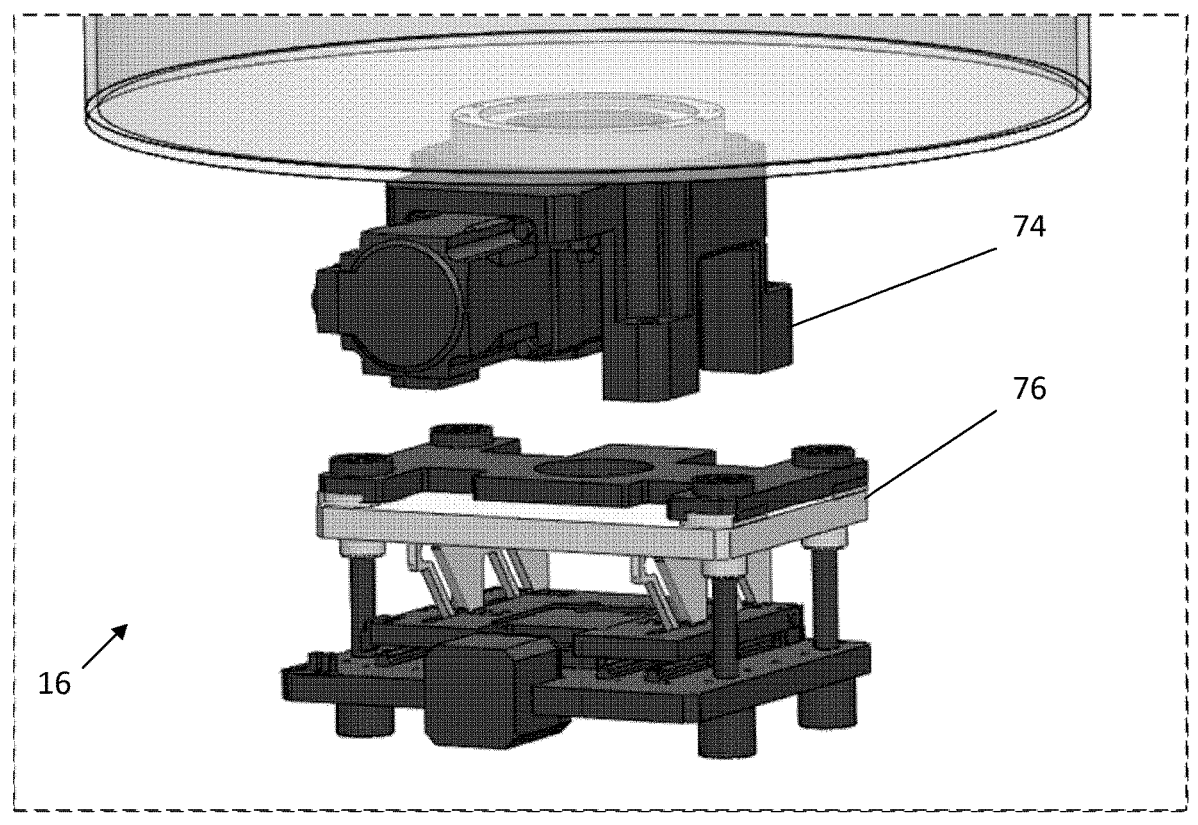
FIG. 15 shows an example of an actuator.

In the example of FIG. 15, the system 10 also includes a humidity sensor 72 for monitoring the humidity level in the environmental enclosure 58. Based on feedback from the humidity sensor 72, the system 10 can regulate the humidity of the environment inside the environmental enclosure 58. In some implementations, the system 10 can raise the humidify of the environment inside the environmental enclosure 58 relative to the outside environment in order to reduce reagent evaporation. In the example of FIG. 15, the inert gas source 64 includes separate sources for gasses of different relative humidity (e.g. one gas source at 100% relative humidity and one gas source at 0% relative humidity), and the system 10 is configured to regulate the supply from each source to regulate the humidity inside the environmental enclosure 58 to a desired level. In the example of FIG. 15, components that may be sensitive or otherwise negatively impacted by high humidity (e.g. electrical motors of the actuators 16, 52, circuitry of the digital system controller 60) are located outside the environmental enclosure 58.

In some implementations, reagents used in a multi-step bio-reaction may degrade when exposed to light. In those instances, it may be desirable for the environmental enclosure 58 to be optically opaque. In other implementations, it is not necessary for the environmental enclosure 58 to be optically opaque.

Actuator

FIG. 15 shows an example of an actuator 16 configured to both rotate and translate the well arrangement relative to the substrate arrangement. In the particular example shown in FIG. 15, the actuator includes a rotational actuator 74 configured to rotate the well arrangement mounted on top of a linear actuator 76 configured to translate the well arrangement upward and downward. The actuator configuration shown in FIG. 15 is just one possible configuration. Many other configurations are also possible.

Substrate Loading

In some examples, all of the bio-reaction substrates may be loaded into the system at the same time. In some of those examples, including implementations in which the system is configured to simultaneously dip all of the bio-reaction substrates into fluidic wells at the same time (for example, as shown in FIGS. 13*a*-*c*), it may be desirable to configure the system so that certain fluidic wells are initially filled with a first type of reagent (e.g. a buffer reagent that does not significantly react with the analyte on the bio-reaction substrates dipped into that particular well) and later replaced at an appropriate point in the process with a second type of reagent (e.g. a reagent configured to react with the analyte on the bio-reaction substrates dipped into that particular well). In this or other ways, the system 10 can be configured so that each of the bio-reaction substrates begins the bio-reaction process when it reaches the fluidic well corresponding to the first step in the bio-reaction. In other implementations, the system may be configured so that only some of the bio-reaction substrates are dipped into the fluidic wells at a particular step in the process.

FOR EXAMPLE ONLY

The above-described systems and methods are for example only. Additions, deletions, substitutions, and other changes and modifications may be made to those examples without departing from the scope or spirit of the inventions reflected in the following claims.

The invention claimed is:

1. A parallel multi-step bio-reaction system, comprising:
   (a) a substrate arrangement comprising a plurality of bio-reaction substrate holders holding a plurality of bio-reaction substrates;
   (b) a well arrangement comprising a plurality of fluidic wells, the fluidic wells corresponding to a plurality of steps of a multi-step bio-reaction;
   (c) an actuator that:
      (i) moves either the substrate arrangement or the well arrangement relative to the other of the substrate arrangement or the well arrangement to change the alignment of the bio-reaction substrates as a group relative to the fluidic wells as a group; and
      (ii) brings the bio-reaction substrates into and out of contact with fluids in the fluidic wells by dipping the bio-reaction substrates into the fluidic wells; and
   (d) a fluidic replacement sub-system that replaces fluids in the fluidic wells.

2. The parallel multi-step bio-reaction system of claim 1, wherein the system moves either the substrate arrangement or the well arrangement in a fashion that incrementally shifts the positions of the bio-reaction substrates relative to the fluidic wells equally.

3. The parallel multi-step bio-reaction system of claim 1, wherein the actuator rotates the well arrangement relative to the substrate arrangement to change the alignment of the bio-reaction substrates as a group relative to the fluidic wells as a group.

4. The parallel multi-step bio-reaction system of claim 3, wherein the actuator is configured to translate the well arrangement relative to the substrate arrangement to bring the bio-reaction substrates into and out of contact with fluids in the fluidic wells.

5. The parallel multi-step bio-reaction system of claim 4, wherein the actuator is configured to vertically translate the well arrangement relative to the substrate arrangement to dip the bio-reaction substrates into the fluids in the fluidic wells.

6. The parallel multi-step bio-reaction system of claim 2, wherein the actuator comprises a rotational actuator component configured to rotate the well arrangement relative to the substrate arrangement and a linear actuator component configured to translate the well arrangement relative to the substrate arrangement.

7. The parallel multi-step bio-reaction system of claim 2, wherein the well arrangement comprises a well plate.

8. The parallel multi-step bio-reaction system of claim 7, wherein the well plate comprises a well carousel.

9. The parallel multi-step bio-reaction system of claim 7, wherein the well plate further comprises a plurality of heaters and a plurality of temperature sensors.

10. The parallel multi-step bio-reaction system of claim 9, wherein the well plate further comprises a plurality of sections, each section including at least two of the fluidic wells, each section including at least one of the heaters and at least one of the temperature sensors.

11. The parallel multi-step bio-reaction system of claim 10, wherein at least some of the sections each comprise at least one reactive reagent fluidic well and at least one buffer fluid reagent well.

12. The parallel multi-step bio-reaction system of claim 1, wherein the fluidic replacement sub-system comprises at least one fluidic outlet and at least one fluidic inlet.

13. The parallel multi-step bio-reaction system of claim 12, further comprising a second actuator configured to move the fluidic outlet and the fluidic inlet between a first position and a second position.

14. The parallel multi-step bio-reaction system of claim 13, wherein, when in the first position, the at least one fluidic outlet is positioned to dispense a fresh fluid into a first fluidic well located at the fluidic replacement sub-system and the at least out fluidic inlet is positioned to withdraw a spent fluid from the first fluidic well located at the fluidic replacement sub-system.

15. The parallel multi-step bio-reaction system of claim 14, wherein, when in the first position, the at least one fluidic outlet is positioned above a fluid fill level of the first fluidic well.

16. The parallel multi-step bio-reaction system of claim 15, wherein, when in the first position, the at least one fluidic inlet is positioned proximate a bottom of the first fluidic well.

17. The parallel multi-step bio-reaction system of claim 16, wherein, when in the second position, the at least one fluidic inlet is withdrawn relative to the fluidic wells.

18. The parallel multi-step bio-reaction system of claim 13, wherein the fluidic replacement sub-system comprises at least a first fluidic outlet, a first fluidic inlet, a second fluidic outlet, and a second fluidic inlet;

wherein the first fluidic outlet comprises a first reagent fluid outlet;

wherein the second fluidic outlet comprises a second reagent fluid outlet; and the first reagent fluid being a different type of reagent from the second reagent fluid.

19. The parallel multi-step bio-reaction system of claim 18, wherein, when in the first position:

the first fluidic outlet is positioned to dispense a fresh first reagent fluid into a first fluidic well located at the fluidic replacement sub-system;

the first fluidic inlet is positioned to withdraw spent first reagent fluid from the first fluidic well;

the second fluidic outlet is positioned to dispense a fresh second reagent fluid into a second fluidic well located at the fluidic replacement sub-system;

the second fluidic inlet is positioned to withdraw spent second reagent fluid from the second fluidic well.

20. The parallel multi-step bio-reaction system of claim 12, further comprising an environmental enclosure enclosing the substrate arrangement, the well arrangement, the fluidic outlet, and the fluidic inlet.

21. The parallel multi-step bio-reaction system of claim 20, wherein the system is configured to fill the environmental enclosure with a gas.

22. The parallel multi-step bio-reaction system of claim 21, wherein the system further comprises an oxygen detector configured to detect oxygen in the environmental enclosure.

23. The parallel multi-step bio-reaction system of claim 20, wherein the system further comprises a humidification sub-system configured to monitor and humidify the environmental enclosure.

24. The parallel multi-step bio-reaction system of claim 20, wherein the environmental enclosure is optically opaque.

25. The parallel multi-step bio-reaction system of claim 20, wherein the environmental enclosure is not optically opaque.

26. The parallel multi-step bio-reaction system of claim 1, wherein the bio-reaction substrates each comprise at least one surface defining a plurality of analyte binding sites.

27. The parallel multi-step bio-reaction system of claim 26, wherein the plurality of analyte binding sites comprise an array of discrete functionalized sites configured to bind discrete analyte units.

28. The parallel multi-step bio-reaction system of claim 26, wherein the bio-reaction substrates each comprise a detector configured to detect bio-reaction events at the analyte binding sites.

29. The parallel multi-step bio-reaction system of claim 28, wherein the detector comprises a photodiode array.

30. The parallel multi-step bio-reaction system of claim 28, wherein the system further comprises at least one readout sub-system, the system configured to wirelessly transmit data collected by the detector to the readout sub-system.

31. The parallel multi-step bio-reaction system of claim 28, wherein the system further comprises at least one readout sub-system, the system configured to transmit data collected by the detector to the readout sub-system over a physical data connection.

* * * * *